United States Patent [19]

Fox et al.

[11] Patent Number: 4,933,622
[45] Date of Patent: Jun. 12, 1990

[54] CIRCUIT AND METHOD FOR DISCHARGING DC FILTER CAPACITORS

[75] Inventors: David A. Fox; Ralph D. Jessee, both of Lima, Ohio

[73] Assignee: Westinghouse Electric Corp., Pittsburgh, Pa.

[21] Appl. No.: 290,396

[22] Filed: Dec. 29, 1988

[51] Int. Cl.$^5$ ................................................ H02J 7/00
[52] U.S. Cl. ........................................ 320/1; 320/13; 322/25
[58] Field of Search ...................... 322/23, 24, 25, 28, 322/95; 320/1, 13

[56] References Cited

U.S. PATENT DOCUMENTS

| 3,987,356 | 10/1976 | Steigerwald | 320/1 X |
| 4,237,385 | 12/1980 | Jurgens et al. | 320/13 X |
| 4,807,106 | 2/1989 | Baker et al. | 322/25 X |

FOREIGN PATENT DOCUMENTS 2045321  9/1978  Fed. Rep. of Germany .......... 320/1

Primary Examiner—Patrick R. Salce
Assistant Examiner—Kristine Peckman
Attorney, Agent, or Firm—R. P. Lenart

[57] ABSTRACT

An electric generating system having a discharge circuit for a DC filter capacitor includes an electric power source for producing a DC voltage on a pair of conductors and a DC filter capacitor electrically connected between the conductors. A voltage indicating signal, representative of the actual output voltage of the generator, is combined with a reference signal to obtain a control signal which varies in proportion to the difference between the desired output voltage of the power source and the actual output voltage. Power source output voltage is controlled in response to the control signal. A branch circuit with a solid state switching device is connected across the DC filter capacitor. The solid state switching device is turned on for a limited time in response to a change in the magnitude of the control signal resulting from an increase in the actual output voltage of the power source, thereby discharging the DC filter capacitor.

6 Claims, 4 Drawing Sheets

CIRCUIT AND METHOD FOR DISCHARGING DC FILTER CAPACITORS

BACKGROUND OF THE INVENTION

This invention relates to circuits and methods for discharging DC filter capacitors in electric power systems.

Certain electric power systems, such as those used for aircraft applications, include an electric generator having an output which is rectified to produce a DC voltage on a pair of conductors. This DC voltage may be transmitted directly to a load or it may be used by an inverter to produce a constant frequency AC output voltage. In both cases, typical voltage regulators used in the system sense the output voltage, compare it to a reference, and amplify a resulting error signal to produce exciter field current in the generator, thereby controlling the output of the system. A filter capacitor is connected between the DC conductors to filter the DC voltage. This capacitor must be sufficiently large to provide a low impedance source for an inverter in a DC link variable speed constant frequency system, or to filter the ripple in a DC system. Typical capacitor values are 55 microfarads for 270 Vdc systems or 165 microfarads for 115 Vac, 20 kW, variable speed constant frequency systems. In both cases, the DC voltage at the capacitor is about 270 Vdc under normal operating conditions.

At rated load, the effects of the filter capacitor are insignificant, amounting to only a fraction of a millisecond of energy storage. At light loads, however, the discharge time may become significant. In extreme cases, for a DC system, a 100% load removal will cause a large overvoltage on the filter capacitor, which has no discharge path except the leakage of the filter itself.

For an AC system, losses in the inverter provide a minimum load to the filter, typically discharging the overvoltage in about 10 milliseconds. DC systems, however, require a preload to produce the same results. The continuous losses of a preload result in an unsatisfactory reduction in system efficiency.

With recent improvements in voltage regulator control circuits, the filter capacitor discharge may be the limiting factor in transient response improvement. In a DC link variable speed constant frequency system, a rated load removal causes a temporary increase in output voltage until the control loop returns the output voltage to its normal level. Attempts to improve the response of the system by increasing the gain of the control loop may result in an underdamped system with an undershoot nearly as large as the overshoot voltage. This non-linearity in transient response is caused by the slow discharge time of the DC link filter capacitor. If the generator voltage drops faster than the link voltage, the voltage control loop is broken. Generator voltage is forced down until the link capacitor discharges to rated voltage. Generator excitation then increases but the system voltage continues to sag until the generator begins to recharge the DC link capacitor. With the control loop again closed, the output increases back to rated voltage with very little overshoot if the control loop is well damped.

With the rate of capacitor discharge being the limiting factor in transient response, it is desirable to provide a circuit for discharging the DC filter capacitor when the power system experiences a sudden decrease in load or load removal.

SUMMARY OF THE INVENTION

Electric generating systems having discharge circuits for DC filter capacitors constructed in accordance with the present invention include an electric power source for producing a DC voltage on a pair of DC conductors. A DC filter capacitor is electrically connected between the conductors. A sensing circuit produces a voltage indicating signal, representative of the actual output voltage of the power source. This signal is combined with a reference signal to obtain an error signal that is proportional to the difference between the desired output voltage of the power source and the actual output voltage of the power source. The actual output voltage of the generator is controlled in response to this error signal. A circuit branch, including a solid state switching device, is connected across the DC filter capacitor. When a change in magnitude of the error signal results from an increase of the actual output voltage of the power source, as may occur during a sudden load reduction or load removal, a solid state switching device is turned on for a limited time, thereby discharging the DC filter capacitor.

When this invention is applied to a DC link, variable speed constant frequency power system, the system also includes an inverter for producing AC voltage on a power bus and the voltage indicating signal may be representative of the actual AC output voltage on the power bus.

This invention encompasses both power systems having capacitor discharge circuits and the methods of discharging DC filter capacitors performed by those circuits. Implementation of this invention can be accomplished with relatively simple control circuitry with low steady state power dissipation. The invention is applicable to a wide range of DC power systems which include DC filter capacitors.

BRIEF DESCRIPTION OF THE DRAWINGS

The invention will be more readily understood by reference to the following drawings, showing the preferred embodiments by way of example only, wherein.

DESCRIPTION OF THE PREFERRED EMBODIMENTS

Figure 1:
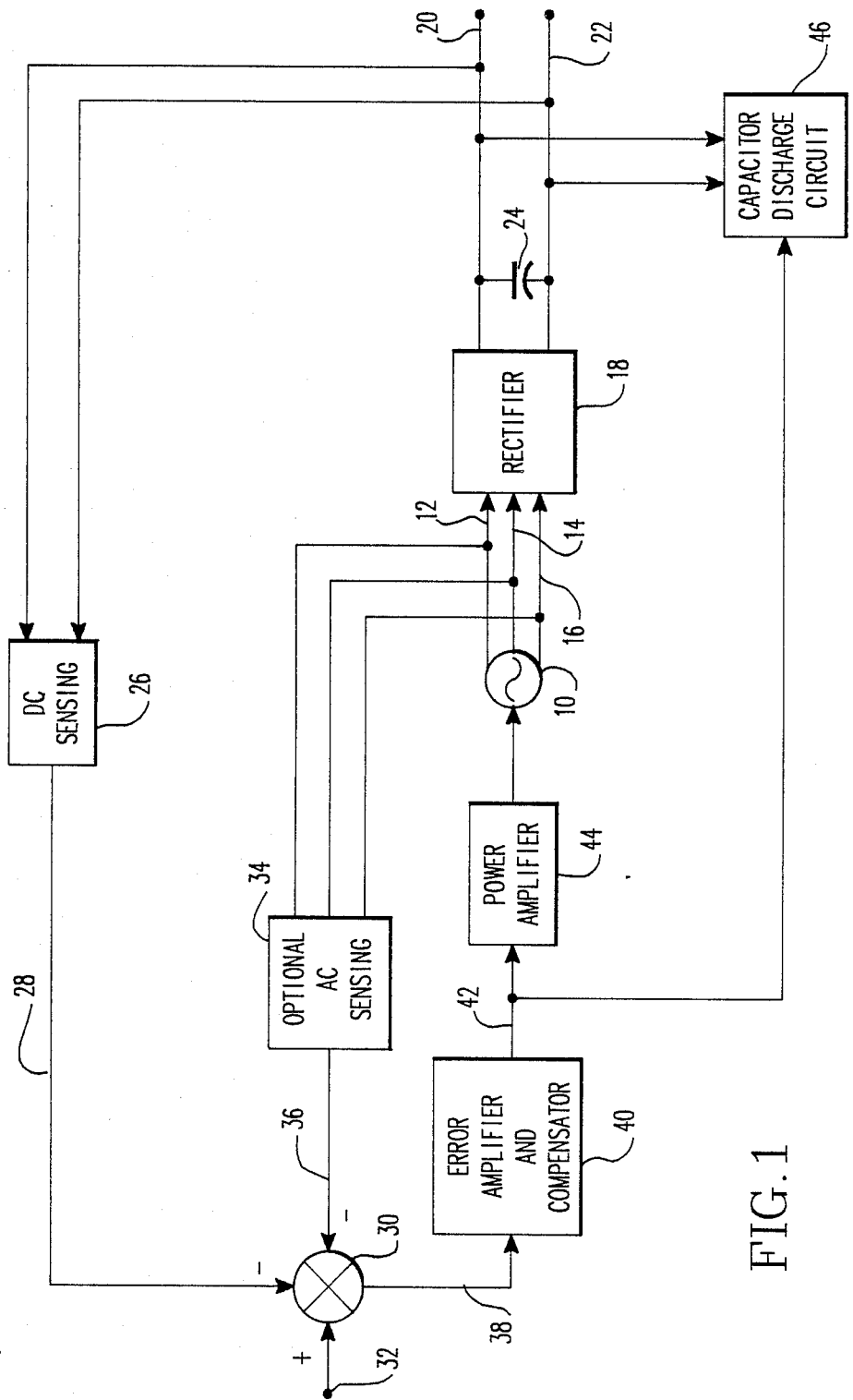
FIG. 1 is a block diagram of a DC power system constructed in accordance with one embodiment of the present invention.

Referring to the drawings, FIG. 1 is a block diagram of a DC power system which includes a discharge circuit for a DC filter capacitor constructed in accordance with the present invention. The system includes a generator 10 which produces an AC output on a plurality of output conductors 12, 14 and 16. This AC output is rectified by a rectifier 18 to produce a DC voltage on a pair of conductors 20 and 22. A DC filter capacitor 24 is electrically connected between these conductors.

A DC sensing circuit 26 monitors the output voltage on conductors 20 and 22 and produces a voltage indicating signal on line 28 which is representative of a DC voltage present between the conductors. This signal is fed to summation point 30 and combined with a reference signal which is supplied on terminal 32. An optional AC sensing circuit 34 monitors the AC output voltage of the generator and produces a second voltage indicating signal on line 36. The output of summation point 30 on line 38 is an error signal and serves as an input to error amplifier and compensator 40 which produces a generator field control signal on line 42 that varies in proportion to the difference between a desired output voltage of the generator and the actual output voltage of the generator. A power amplifier 44 responds to the field control signal to control the exciter field current of the generator and thereby control its output voltage. A capacitor discharge circuit 46 also responds to a decrease in the field control signal by enabling a discharge circuit path connected across the DC filter capacitor for a limited time in response to a change in the magnitude of the control signal caused by an increase in the actual output voltage of the generator, thereby discharging the DC filter capacitor. In the circuit of FIG. 1, all of the circuits, with the exception of the capacitor discharge circuit 46, are constructed in accordance with known techniques.

Figure 2:
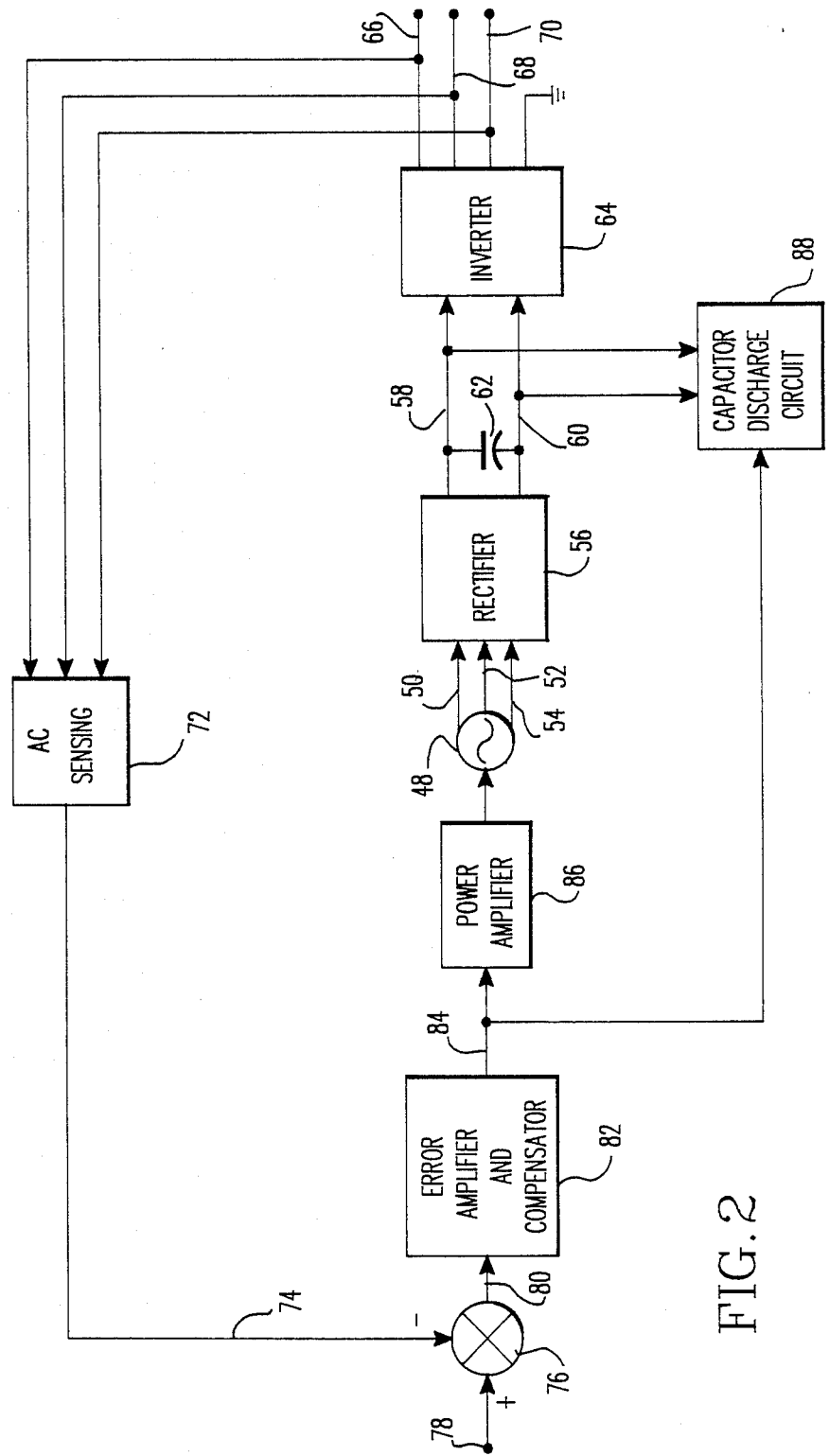
FIG. 2 is a block diagram of a DC link, variable speed constant frequency power system constructed in accordance with the present invention.

FIG. 2 is a block diagram of a DC link, variable speed constant frequency power system which includes a capacitor discharge circuit constructed in accordance with this invention. This system includes a generator 48 which may be driven at a variable speed by a prime mover, not shown, to produce an AC output voltage on lines 50, 52 and 54. This AC voltage is rectified by rectifier 56 to produce a DC voltage on DC link conductors 58 and 60. A filter capacitor 62 is connected between the DC link conductors. An inverter 64 transforms the voltage on the DC link conductors into a constant frequency AC output voltage on lines 66, 68 and 70. This AC output voltage is sensed by a sensing circuit 72 to produce a voltage indicating signal on line 74 which is representative of the actual AC output voltage of the inverter. This voltage indicating signal is combined in summation point 76 with a reference signal supplied on terminal 78 to produce an error signal on line 80 which serves as an input to an error amplifier and compensator 82. A generator field control signal is then produced on line 84 and used by the power amplifier 86 to control the exciter field current of the generator 48, thereby controlling its output voltage. A capacitor discharge circuit 88 responds to a change in magnitude of the field control signal which results from an increase in the AC output voltage of the inverter to enable a discharge circuit connected across capacitor 62, thereby discharging the capacitor.

Figure 3:
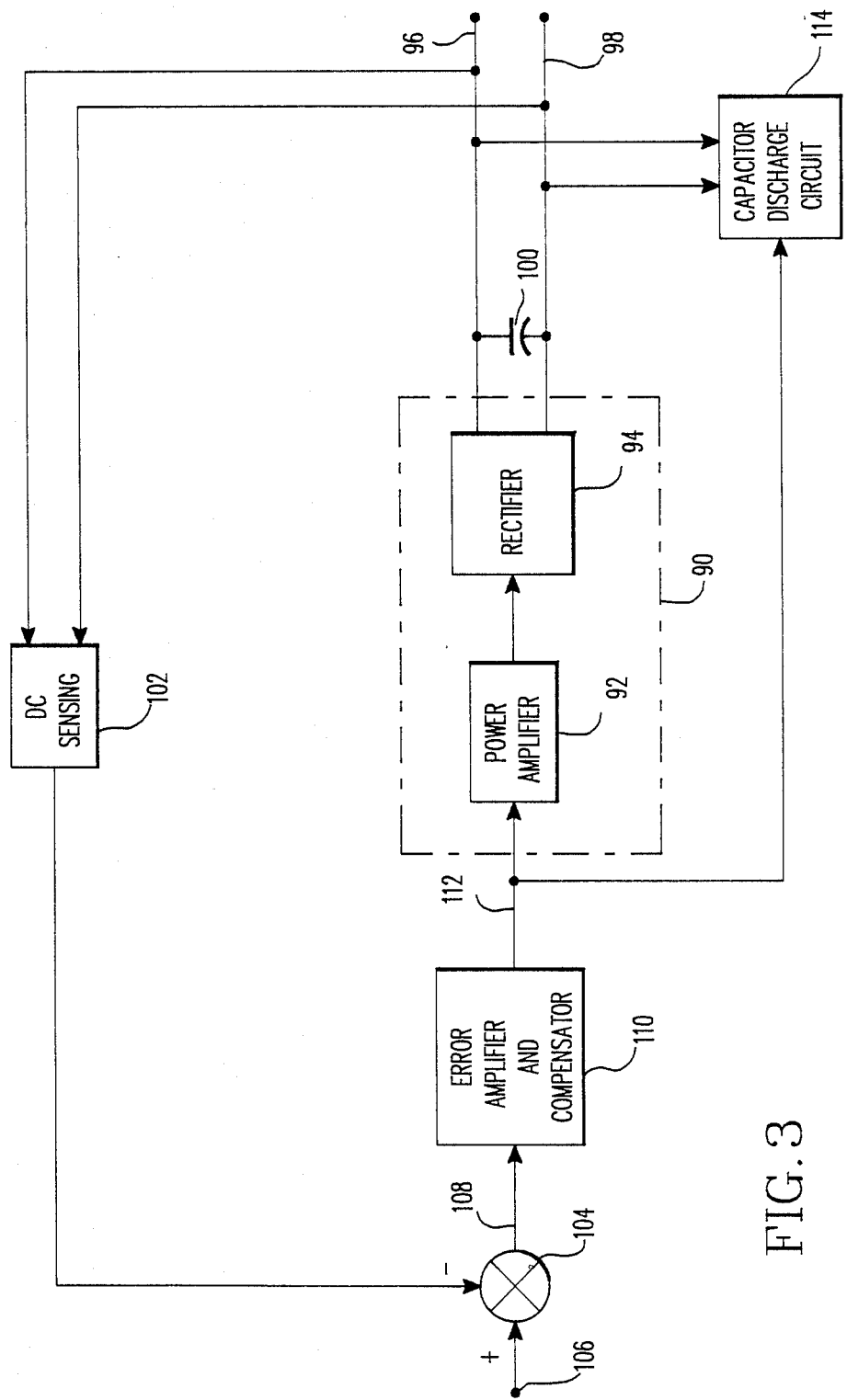
FIG. 3 is a block diagram of a DC power system constructed in accordance with an alternative embodiment of this invention.

FIG. 3 is a block diagram of another DC power system which includes a capacitor discharge circuit constructed in accordance with this invention. This system includes a controllable power source 90 comprised of a power amplifier 92 and a rectifier 94. The power source produces a DC output voltage on conductors 96 and 98. A filter capacitor 100 is connected between the DC conductors. The DC output voltage on these conductors is sensed by a sensing circuit 102 and a signal representative of the output voltage is combined in summation point 104 with a reference signal supplied on terminal 106 to produce an error signal on line 108. This signal is amplified and conditioned by an error amplifier and compensator 110 to produce a control signal on line 112. This control signal controls the output of power supply 90. A capacitor discharge circuit 114 responds to a change in the magnitude of the control signal on line 112 which results from an increase in the DC output voltage sensed by sensing circuit 102 thereby enabling the discharge circuit connected across capacitor 100 and discharging the capacitor.

Figure 4:
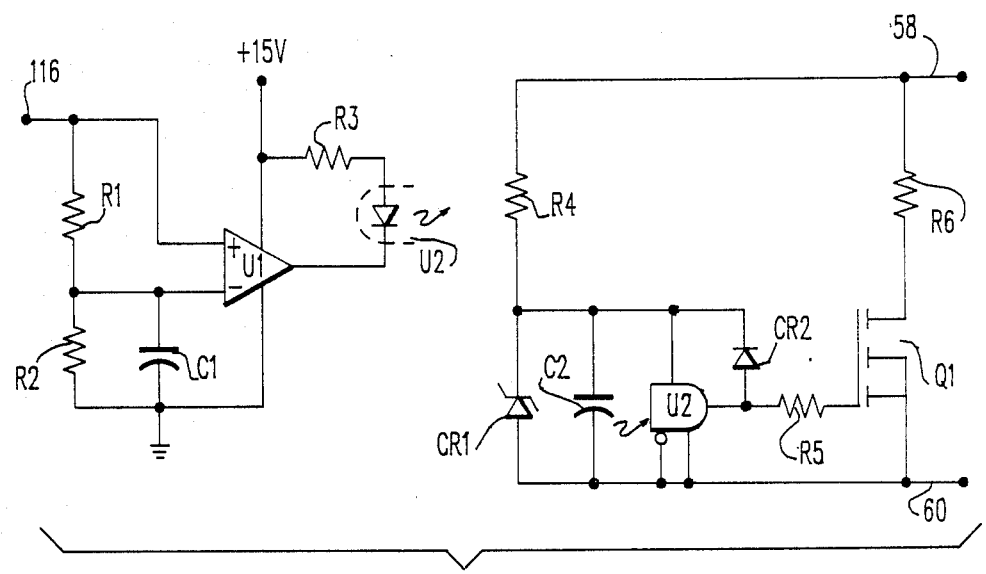
FIGS. 4 and 5 are schematic diagrams of capacitor discharge circuits which may be used in the power systems of FIGS. 1, 2 or 3.

FIG. 4 is a schematic diagram of a capacitor discharge circuit which may be used in the systems illustrated in FIGS. 1, 2 or 3. This circuit employs optical isolation which is particularly useful in DC link variable speed constant frequency systems where isolation is required between the control circuits and the DC link. The generator field control signal on line 42 in FIG. 1 or line 84 in FIG. 2 is supplied to terminal 116 in FIG. 4. Although it varies in magnitude under normal load operation, the field control signal provides a positive current through resistor R1 of the voltage divider in FIG. 4, thereby keeping the output of amplifier U1 at a high level. Consequently, no current flows in the diode of the optoisolator U2 and the discharge circuit remains off. Capacitor C1 maintains a positive voltage at the inverting input of amplifier U1. In the event of a sudden load removal requiring a decrease in generator excitation, the field control signal will decrease rapidly to less than the voltage on capacitor C1. This causes the output of amplifier U1 to switch low, providing drive current for optoisolator U2. The output of optoisolator U2 then turns on, thereby turning on transistor Q1 and connecting discharge resistor R6 across the DC link conductors 58 and 60 to discharge the filter capacitor. In one embodiment of this invention, resistor R6 and the DC link capacitor have a one millisecond discharge time constant. This ensures that the DC link capacitor will discharge fast enough to keep the generator rectifiers conducting and the regulation control loop closed. When the error amplifier recovers from the transient, amplifier U1 returns to the high output state and transistor Q1 is turned off. The voltage divider formed by resistors R1 and R2 ensures that the discharge circuit cannot remain on longer than a time controlled by capacitor C1. For any steady state condition, the discharge circuit will be off.

Power for the output of optoisolator U2 and transistor Q1 is provided by resistor R4 and zener diode CR1 which are connected in series across the DC link conductors. Diode CR2 clamps any reverse current through the gate-drain capacitance of transistor Q1 which could turn on Q1 before optoisolator U2 can clamp the gate. Resistor R5 slows down the switching speed of transistor Q1 to control the voltage developed across the discharge resistor R6 when Q1 turns off.

Figure 5:
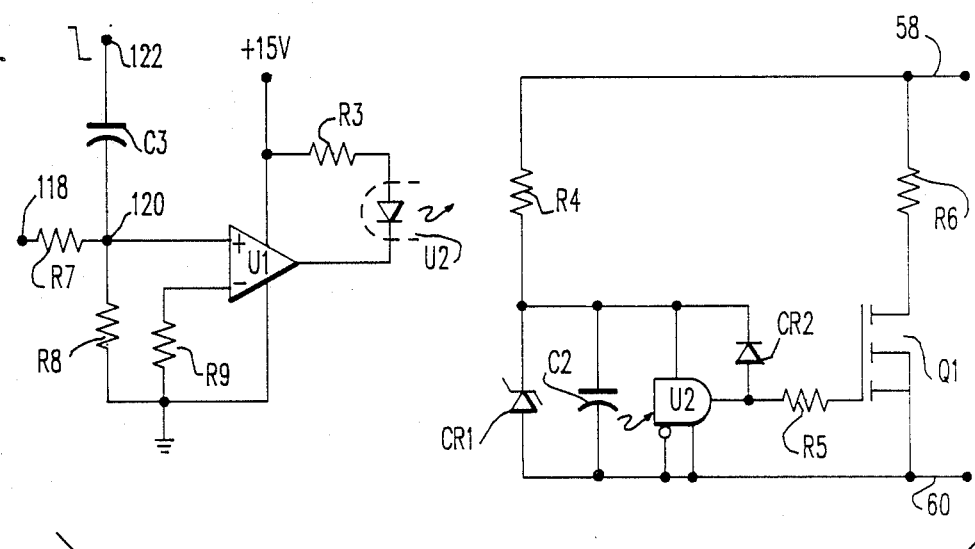

FIG. 5 is a schematic diagram of an alternative embodiment of a capacitor discharge circuit which may be used in the systems illustrated in FIGS. 1, 2 or 3. Since the circuit of FIG. 5 utilizes many of the same components of the circuit of FIG. 4, like item designations in those circuits refer to identical components. In FIG. 5, a reference voltage is supplied to terminal 118 to establish a fixed DC bias voltage at the junction point 120 between resistors R7 and R8. Capacitor C3 is connected to that junction point and is connected to receive the control signal applied to terminal 122. With this arrangement, a sudden decrease in the control voltage signal, exceeding the DC bias voltage established at junction point 120, will trigger the clamp circuit, thereby discharging the filter capacitor.

The addition of the discharge circuit of FIGS. 4 or 5 to the prior art control components of FIG. 1, 2 or 3 results in a significant improvement in the transient response of the system upon load removal. In one embodiment, transient response with the discharge circuit of this invention is about twice as fast as it would have been without the discharge circuit.

It should now be apparent that the present invention provides improved transient response of electric power systems subject to sudden load removal, by discharging the DC filter capacitor. Although the present invention has been described in terms of what are presently believed to be its preferred embodiments, it will be apparent to those skilled in the art that various changes may be made without departing from the scope of the invention. It is therefore intended that the appended claims cover such changes.

What is claimed is:

1. An electric power system having a discharge circuit for a DC filter capacitor comprising:
   an electric power source for producing a DC voltage on a pair of DC conductors;
   a DC filter capacitor electrically connected between said DC conductors;
   means for producing a voltage indicating signal representative of the actual output voltage of said power source;
   means for combining said voltage indicating signal with a reference signal to obtain a control signal which varies in proportion to the difference between a desired output voltage of said power source and said actual output voltage of said power source;
   means for controlling the output voltage of said power source in response to said control signal;
   a first circuit branch including a switching device and connected across said DC filter capacitor;
   means for turning on said switching device for a limited time in response to a change in magnitude of said control signal resulting from an increase in said actual output voltage of said power source, thereby discharging said DC filter capacitor; and
   said means for turning on said switching device including a voltage divider including first and second resistors electrically connected in series, said voltage divider being connected to receive said control signal; an operational amplifier having a non-inverting input connected to one end of said voltage divider and having an inverting input electrically connected to a junction point between said first and second resistors of said voltage divider; a timing capacitor electrically connected in parallel with said second resistor; and a drive circuit for turning on said switching device in response to an output signal from said operational amplifier.

2. An electric power system having a discharge circuit for a DC filter capacitor comprising:
   an electric power source for producing a DC voltage on a pair of DC conductors;
   a DC filter capacitor electrically connected between said DC conductors;
   means for producing a voltage indicating signal representative of the actual output voltage of said power source;
   means for combining said voltage indicating signal with a reference signal to obtain a control signal which varies in proportion to the difference between a desired output voltage of said power source and said actual output voltage of said power source;
   means for controlling the output voltage of said power source in response to said control signal;
   a first circuit branch including a switching device and connected across said DC filter capacitor;
   means for turning on said switching device for a limited time in response to a change in magnitude of said control signal resulting from an increase in said actual output voltage of said power source, thereby discharging said DC filter capacitor; and
   said means for turning on said switching device including a voltage divider including first and second resistors electrically connected in series, said voltage divider being connected to receive a DC voltage at one end; an operational amplifier having a non-inverting input connected to a junction point between said first and second resistors of said voltage divider and having an inverting input; a third resistor electrically connected between said inverting input and a second end of said voltage divider; a capacitor electrically connected between said junction point and a terminal for receiving said control signal; and a drive circuit for turning on said switching device in response to an output signal from said operational amplifier.

3. An electric power system having a discharge circuit for a DC filter capacitor comprising:
   an electric generator;
   means for rectifying an output voltage from said generator to produce a DC voltage on a pair of DC conductors;
   a DC filter capacitor electrically connected between said DC conductors;
   an inverter electrically connected to receive said DC voltage from said DC conductors;
   said inverter producing an AC output voltage on a power bus;
   means for producing a voltage indicating signal representative of the actual AC output voltage on said power bus;
   means for combining said voltage indicating signal with a reference signal to obtain a control signal Which varies in proportion to the difference between a desired AC output voltage on said power bus and said actual AC output voltage on said power bus;
   means for controlling the output voltage of said generator in response to said control signal;
   a first circuit branch including a switching device and connected across said DC filter capacitor; and
   means for turning on said switching device for a limited time in response to a change in magnitude of said control signal resulting from an increase in said actual AC output voltage on said power bus, thereby discharging said DC filter capacitor.

4. An electric generating system as recited in claim 3, wherein said means for turning on said switching device comprises;
   a voltage divider including first and second resistors electrically connected in series, said voltage divider being connected to receive said control signal;
   an operational amplifier having a non-inverting input connected to one end of said voltage divider and having an inverting input electrically connected to a junction point between said first and second resistors of said voltage divider;

a timing capacitor electrically connected in parallel with said second resistor; and a drive circuit for turning on said switching device in response to an output signal from said operational amplifier.

5. An electric power system as recited in claim 3, wherein said means for turning on said switching device comprises;

a voltage divider including first and second resistors electrically connected in series, said voltage divider being connected to receive a DC voltage at one end;

an operational amplifier having a non-inverting input connected to a junction point between said first and second resistors of said voltage divider and having an inverting input;

a third resistor electrically connected between said inverting input and a second end of said voltage divider;

a capacitor electrically connected between said junction point and a terminal for receiving said control signal; and a drive circuit for turning on said switching device in response to an output signal from said operational amplifier.

6. A method of discharging a DC filter capacitor in an electric power system, said method comprising the steps of:

rectifying an output voltage from an electric generator to produce a DC voltage on a pair of DC conductors;

connecting a DC filter capacitor between said DC conductors;

connecting an inverter to receive said DC voltage from said DC conductors;

using said inverter to produce an AC output voltage on a power bus;

producing a voltage indicating signal representative of the actual AC output voltage on said power bus;

combining said voltage indicating signal with a reference signal to obtain a control signal which varies in proportion to the difference between a desired AC output voltage on said power bus and said actual AC output voltage on said power bus;

controlling the output voltage of said generator in response to said control signal;

connecting a first circuit branch, including a switching device, across said DC filter capacitor; and turning on said switching device for a limited time in response to a change in magnitude of said control signal resulting from an increase in said actual AC output voltage on said power bus, thereby discharging said DC filter capacitor.

* * * * *